United States Patent
Ando et al.

(10) Patent No.: US 11,557,311 B2
(45) Date of Patent: Jan. 17, 2023

(54) SATISFACTION ESTIMATION MODEL LEARNING APPARATUS, SATISFACTION ESTIMATING APPARATUS, SATISFACTION ESTIMATION MODEL LEARNING METHOD, SATISFACTION ESTIMATION METHOD, AND PROGRAM

(71) Applicant: NIPPON TELEGRAPH AND TELEPHONE CORPORATION, Chiyoda-ku (JP)

(72) Inventors: Atsushi Ando, Yokosuka (JP); Hosana Kamiyama, Yokosuka (JP); Satoshi Kobashikawa, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 148 days.

(21) Appl. No.: 16/630,896

(22) PCT Filed: Jul. 20, 2018

(86) PCT No.: PCT/JP2018/027211
§ 371 (c)(1),
(2) Date: Jan. 14, 2020

(87) PCT Pub. No.: WO2019/017462
PCT Pub. Date: Jan. 24, 2019

(65) Prior Publication Data
US 2020/0152178 A1 May 14, 2020

(30) Foreign Application Priority Data
Jul. 21, 2017 (JP) .............................. JP2017-141790

(51) Int. Cl.
*G10L 25/48* (2013.01)
*G10L 15/22* (2006.01)
(Continued)

(52) U.S. Cl.
CPC .............. *G10L 25/48* (2013.01); *G06F 40/20* (2020.01); *G06N 3/08* (2013.01); *G10L 15/02* (2013.01);
(Continued)

(58) Field of Classification Search
CPC ......... G10L 25/48; G10L 25/00; G10L 15/02; G10L 15/00; G10L 15/063;
(Continued)

(56) References Cited

U.S. PATENT DOCUMENTS 10,573,293 B2 * 2/2020 Bengio et al. .......... G10L 13/08
2015/0286627 A1 * 10/2015 Chang .................... G06F 40/205
704/9
(Continued)

OTHER PUBLICATIONS

Ruder, Sebastian, Parsa Ghaffari, and John G. Breslin. "A hierarchical model of reviews for aspect-based sentiment analysis." arXiv preprint arXiv: 1609.02745 (2016). (Year: 2016).*
(Continued)

*Primary Examiner* — Jialong He
(74) *Attorney, Agent, or Firm* — Oblon, McClelland, Maier & Neustadt, L.L.P.

(57) ABSTRACT

Estimation accuracies of a conversation satisfaction and a speech satisfaction are improved. A learning data storage unit (10) stores learning data including a conversation voice containing a conversation including a plurality of speeches, a correct answer value of a conversation satisfaction for the conversation, and a correct answer value of a speech satisfaction for each speech included in the conversation. A model learning unit (13) learns a satisfaction estimation model using a feature quantity of each speech extracted from the conversation voice, the correct answer value of the speech satisfaction, and the correct answer value of the conversation satisfaction, the satisfaction estimation model configured by connecting a speech satisfaction estimation
(Continued)

model part that receives a feature quantity of each speech and estimates the speech satisfaction of each speech with a conversation satisfaction estimation model part that receives at least the speech satisfaction of each speech and estimates the conversation satisfaction.

8 Claims, 5 Drawing Sheets

(51) Int. Cl.
- *G06N 3/08* (2006.01)
- *G10L 15/02* (2006.01)
- *G10L 15/06* (2013.01)
- *G10L 15/10* (2006.01)
- *G10L 25/63* (2013.01)
- *G06F 40/20* (2020.01)
- *G10L 15/16* (2006.01)

(52) U.S. Cl.
CPC ............ *G10L 15/063* (2013.01); *G10L 15/10* (2013.01); *G10L 15/22* (2013.01); *G10L 25/63* (2013.01); *G10L 15/16* (2013.01)

(58) Field of Classification Search
CPC ..... G10L 2015/0635; G10L 2015/0636; G10L 15/10; G10L 15/22; G10L 2015/221; G10L 2015/225; G10L 2015/226; G10L 2015/227; G10L 2015/228; G10L 2015/223; G10L 25/63; G10L 15/16; G06N 20/00; G06N 3/08; G06N 3/084; G06F 40/20

See application file for complete search history.

(56) References Cited

U.S. PATENT DOCUMENTS

| | | | |
|---|---|---|---|
| 2017/0011738 A1* | 1/2017 | Senior et al. | G10L 15/063 |
| 2017/0270099 A1* | 9/2017 | Gorny | G06Q 30/02 |
| 2019/0005421 A1* | 1/2019 | Hammel et al. | G06Q 10/067 |

OTHER PUBLICATIONS

International Search Report dated Sep. 18, 2018 in PCT/JP2018/027211 filed on Jul. 20, 2018, 1 page.

Park, Y. et al., "Towards Real-Time Measurement of Customer Satisfaction Using Automatically Generated Call Transcripts," in Proceedings of the 18th ACM conference on Information and knowledge management, 2009, pp. 1387-1396, 11 total pages.

Caruana, R. "Multitask Learning," Machine Learning, vol. 28, No. 1, 1997, pp. 41-75.

\* cited by examiner

SATISFACTION ESTIMATION MODEL LEARNING APPARATUS, SATISFACTION ESTIMATING APPARATUS, SATISFACTION ESTIMATION MODEL LEARNING METHOD, SATISFACTION ESTIMATION METHOD, AND PROGRAM

TECHNICAL FIELD

The present invention relates to a technique for estimating a satisfaction of the entire conversation including a plurality of speeches and a satisfaction of each speech during a conversation.

BACKGROUND ART

For example, in an operation of a call center, there is a need for a technique for estimating satisfactions of customers from conversations during a call. The satisfaction of the customer can be indicated using a gradual category indicating whether or not the customer expresses satisfaction or dissatisfaction during a conversation, for example, by three steps such as satisfied/normal/dissatisfied. In the present specification, in a certain call, a satisfaction of a customer in the entire conversation is referred to as a "conversation satisfaction", and a satisfaction of a customer in a speech part of the customer during the conversation is referred to as a "speech satisfaction." If the conversation satisfaction can be estimated for each call at the call center, operator evaluation can be automated, for example, by aggregating rates at which the conversation satisfaction is "satisfied" or "dissatisfied" for each operator. Further, if the speech satisfaction can be estimated for each speech during a call, for example, an application of investigating customer requests is possible by performing speech recognition and text analysis on only intervals in which the speech satisfaction is "satisfied". Further, although the conversation has been described here as a conversation during a call at the call center, the same can be applied to all conversations which are conducted by a plurality of speakers in a face-to-face/non-face-to-face manner.

As a technique similar to the above technique, a technique for estimating a conversation satisfaction of each call using a feature of a speaking style such as a speech speed of the customer or a linguistic feature such as the presence or absence of a competitor product name has been proposed in Non-Patent Literature 1. The speech satisfaction may be estimated in view of a chronological relevance of the speech satisfaction in addition to a feature quantity such as a voice tone, a backchannel frequency, or the like.

PRIOR ART LITERATURE

Non-Patent Literature

Non-Patent Literature 1: Youngja Park, Stephen C. Gates, "Towards Real-Time Measurement of Customer Satisfaction Using Automatically Generated Call Transcripts," in Proceedings of the 18th ACM conference on Information and knowledge management, pp. 1387-1396, 2009.

SUMMARY OF THE INVENTION

Problems to be Solved by the Invention

In the related art, the estimation of the conversation satisfaction of each call and the estimation of the speech satisfaction of each speech during a call are performed separately. On the other hand, the conversation satisfaction and the speech satisfaction in a certain call are strongly related. For example, in a call in which "dissatisfied" frequently appears as the speech satisfaction, the conversation satisfaction can be expected to be "dissatisfied" as well. Conversely, when the conversation satisfaction is "satisfied", since the customers often disconnect a call after expressing thanks, the speech satisfaction is likely to be "satisfied," for example, near the end of the call. As described above, there is a relation between the conversation satisfaction and the speech satisfaction during the call that it is possible to estimate the other information from one information. However, in the related art, since the estimation of the conversation satisfaction and the estimation of the speech satisfaction are performed separately, such a relation is unable to be used for the estimations. As a result, the conversation satisfaction and the speech satisfaction are likely to lower estimation accuracy together. Further, this can be generalized not only in the case of estimating a satisfaction of the customer in a call but also in the case of estimating a satisfaction of a speaker in a conversation.

In view of the above-described points, it is an object of the present invention to improve the estimation accuracy of each of the conversation satisfaction and the speech satisfaction using the relation between the conversation satisfaction and the speech satisfaction.

Means to Solve the Problems

In order to solve the above-described problems, a satisfaction estimation model learning apparatus according to a first aspect of the invention includes a learning data storage unit that stores learning data including a conversation voice containing a conversation including a plurality of speeches, a correct answer value of a conversation satisfaction for the conversation, and a correct answer value of a speech satisfaction for each of the speeches included in the conversation and a model learning unit that learns a satisfaction estimation model using a feature quantity of each speech extracted from the conversation voice, the correct answer value of the speech satisfaction, and the correct answer value of the conversation satisfaction, the satisfaction estimation model configured by connecting a speech satisfaction estimation model part that receives a feature quantity of each speech and estimates the speech satisfaction of each speech with a conversation satisfaction estimation model part that receives at least the speech satisfaction of each speech and estimates the conversation satisfaction.

In order to solve the above-described problems, a satisfaction estimating apparatus according to a second aspect of the invention includes a model storage unit that stores the satisfaction estimation model learned by the satisfaction estimation model learning apparatus according to the first aspect and a satisfaction estimating unit that inputs the feature quantity of each speech extracted from the conversation voice containing the conversation including a plurality of speeches to the satisfaction estimation model and estimates the speech satisfaction for each speech and the conversation satisfaction for the conversation.

Effects of the Invention

According to the present invention, the estimation accuracies of the conversation satisfaction and the speech satisfaction are improved.

DETAILED DESCRIPTION OF THE EMBODIMENTS

Figure 1:
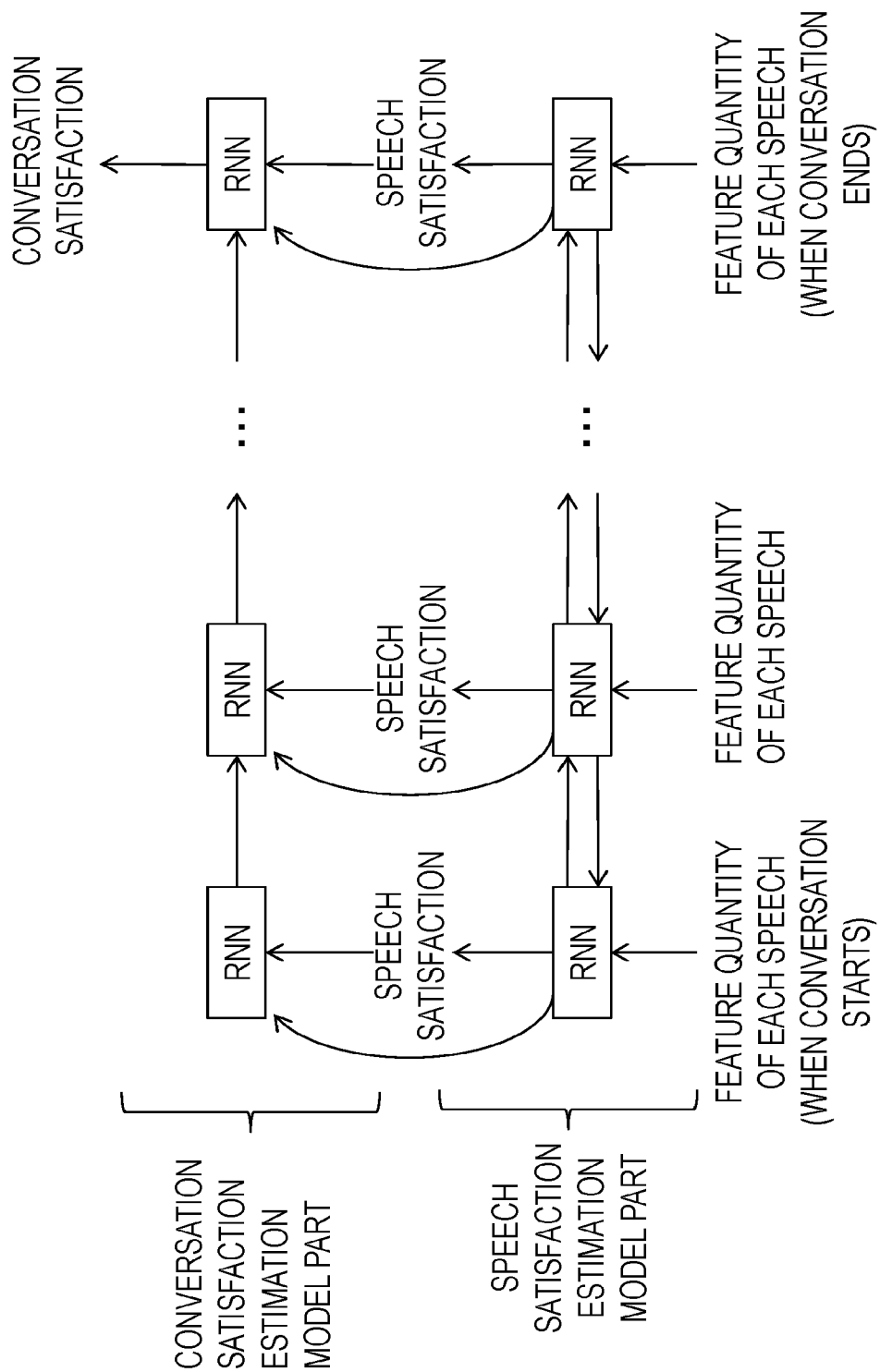
FIG. 1 is a diagram for describing a satisfaction estimation model.

A point of the invention is to learn simultaneously and integrally a satisfaction estimation model that simultaneously estimates the conversation satisfaction and the speech satisfaction as a single model by hierarchically connecting a model for estimating the conversation satisfaction and a model for estimating the speech satisfaction. An example of such a single model is illustrated in FIG. 1. The model illustrated in FIG. 1 is constituted by hierarchically connecting a speech satisfaction estimation model part for estimating a satisfaction of each speech included in a conversation serving as an estimation target and a conversation satisfaction estimation model part for estimating a satisfaction of the entire conversation serving as an estimation target.

The speech satisfaction estimation model part constitutes one speech satisfaction estimator for one speech. The speech satisfaction estimator receives a feature quantity of each speech, estimates the speech satisfaction of the speech using information related to a past speech or past and future speeches of the speech, and outputs an estimation value of the speech satisfaction of the speech. At the same time, information contributing to the estimation of the conversation satisfaction (for example, a length of each speech or the like) is output accompanied by the speech satisfaction. The speech satisfaction estimator is specifically, for example, a recurrent neural network (RNN).

The information contributing to the estimation of the conversation satisfaction output by the speech satisfaction estimator includes all pieces of information calculated in a process in which the recurrent neural network estimates the speech satisfaction from the feature quantity of each input speech. That is, the speech satisfaction estimator receives the feature quantity of each speech, outputs the estimation value of the speech satisfaction of the speech and all pieces of information used to estimate the speech satisfaction, and all pieces of information output from the speech satisfaction estimator are input to a conversation satisfaction estimator.

The conversation satisfaction estimation model part constitutes one conversation satisfaction estimator for one speech satisfaction estimator. The conversation satisfaction estimator receives the estimation value of the speech satisfaction output from the speech satisfaction estimator and the information contributing to the estimation of the conversation satisfaction accompanied by speech satisfaction, and outputs an estimation value of the conversation satisfaction from a first speech included in a conversation to the speech using the information related to the past speech of the speech. A specific example of the conversation satisfaction estimator is a recurrent neural network, similarly to the speech satisfaction estimator.

Figure 2:
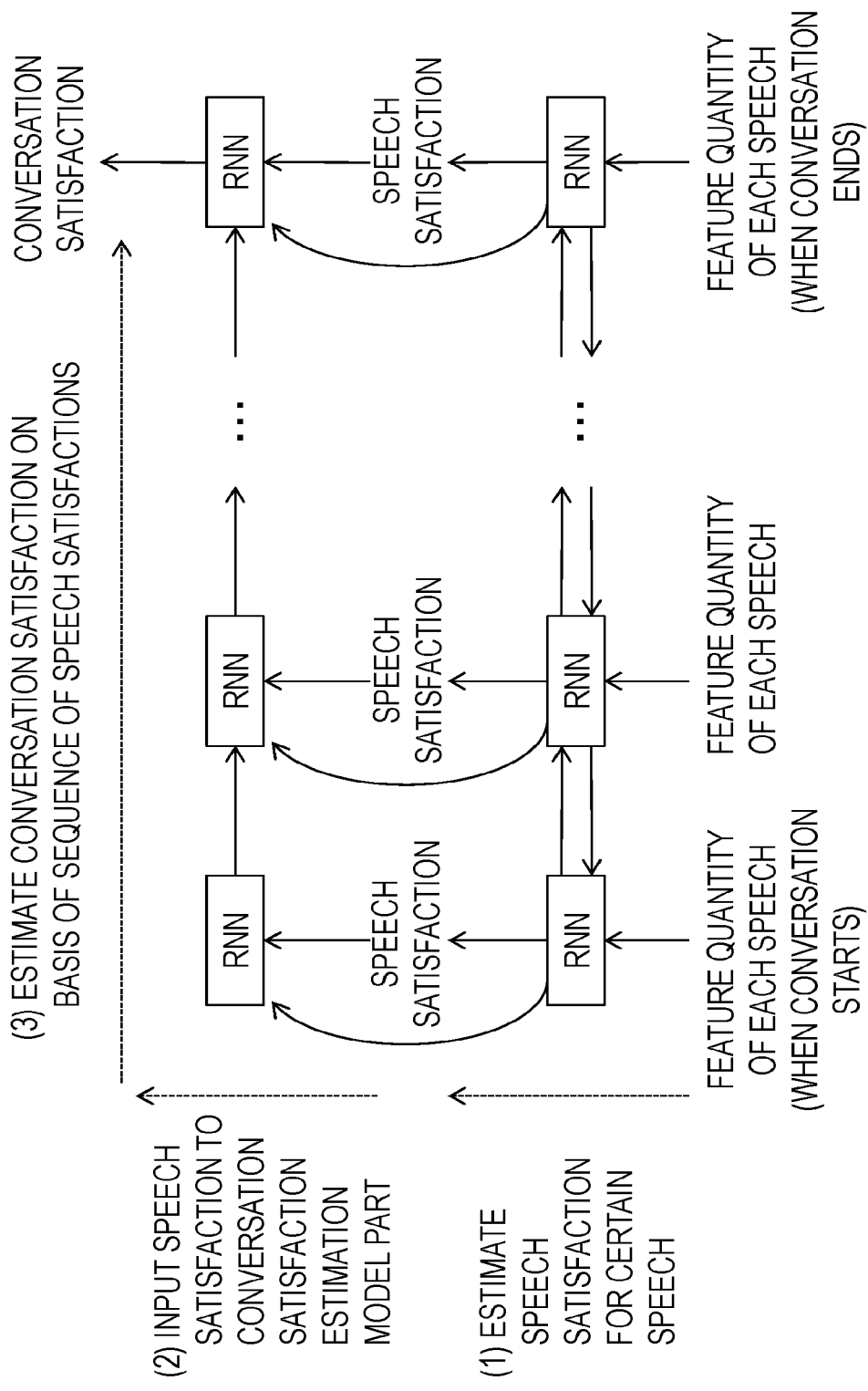
FIG. 2 is a diagram for describing satisfaction estimation by a satisfaction estimation model.

A relation between the conversation satisfaction and the speech satisfaction is considered to be a hierarchical relation. That is, in a conversation between humans, when a certain speech is presented, a listener is expected to estimate the conversation satisfaction on the basis of the estimation value of the speech satisfaction after estimating the speech satisfaction for the speech. For this reason, a hierarchical model that first estimates the speech satisfaction for an input speech and then estimates the conversation satisfaction from the estimation value of the speech satisfaction and the information accompanied by the speech satisfaction is considered to coincide with human perception and to be excellent in the estimation accuracy. FIG. 2 is a diagram illustrating an operation when the model illustrated in FIG. 1 estimates the speech satisfaction and the conversation satisfaction. First, (1) a feature quantity of each speech included in a conversation is input to the speech satisfaction estimation model part for each speech, and the speech satisfaction of each speech is estimated. Next, (2) the speech satisfaction estimated by the speech satisfaction estimation model part is input to the conversation satisfaction estimation model part. This is repeated until the conversation ends. Then, (3) the conversation satisfaction of the conversation including a series of speeches is estimated on the basis of a sequence of speech satisfactions in the conversation satisfaction estimation model part.

Figure 3:
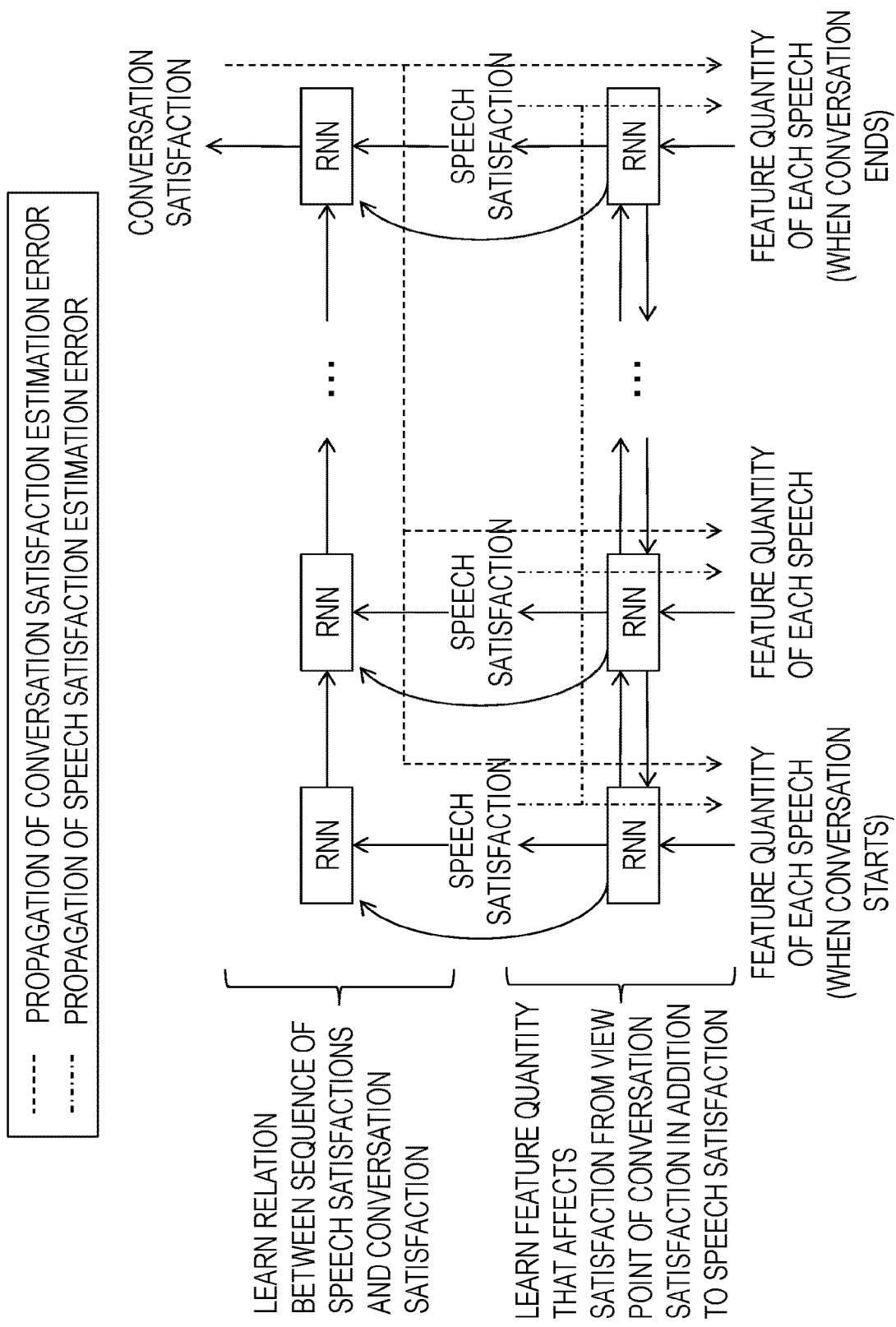
FIG. 3 is a diagram for describing propagation of an estimation error when a satisfaction estimation model is learned.

Learning a model that simultaneously estimates the conversation satisfaction and the speech satisfaction as a single model simultaneously and integrally contributes to the improvement in the estimation accuracy. With integral learning, it is possible not only to model the relation between the conversation satisfaction and the speech satisfaction but also to propagate the estimation error of the conversation satisfaction to the speech satisfaction estimation model part. FIG. 3 illustrates a flow of propagation of the estimation error of the conversation satisfaction and the estimation error of the speech satisfaction in the model illustrated in FIG. 1. This represents learning which feature quantities affect the conversation satisfaction. Accordingly, it is possible to estimate the satisfaction in view of both a partial view point such as the speech satisfaction and a comprehensive view point such as the conversation satisfaction, and the estimation accuracies of the conversation satisfaction and the speech satisfaction can be expected to be improved.

A framework for learning a model in order to solve such a plurality of estimation problems simultaneously is referred to as multitask learning, and many examples with improved accuracy compared to the case of solving individual estimation problems have been reported (For example, see Reference Literature 1). The present invention can be regarded as a type of multitask learning, but one of features thereof lies in that a plurality of tasks are hierarchically learned without learning a plurality of tasks in parallel as in common multitask learning.

[Reference Literature 1] R. Caruana, "Multitask Learning," Machine Learning, vol. 28, no. 1, pp. 41-75, 1997.

Hereinafter, an exemplary embodiment of the invention will be described in detail. In the drawings, components having the same function are denoted by the same reference numerals, and repeated description will be omitted.

[Satisfaction Estimation Model Learning Apparatus]

Figure 4:
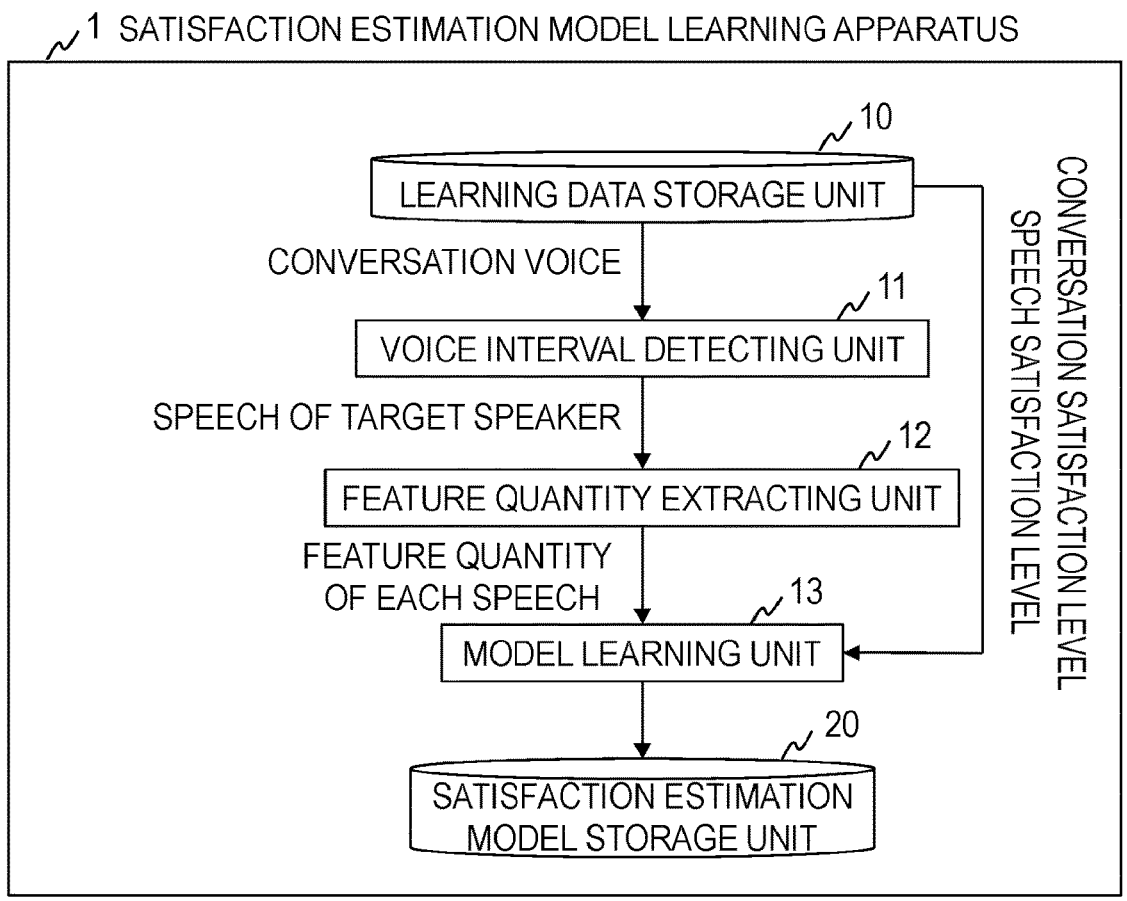
FIG. 4 is a diagram illustrating a functional configuration of a satisfaction estimation model learning apparatus.

As illustrated in FIG. 4, a satisfaction estimation model learning apparatus 1 of an embodiment includes a learning data storage unit 10, a voice interval detecting unit 11, a feature quantity extracting unit 12, a model learning unit 13, and a satisfaction estimation model storage unit 20. The satisfaction estimation model learning apparatus 1 learns the satisfaction estimation model using learning data stored in the learning data storage unit 10, and stores the learned satisfaction estimation model in the satisfaction estimation model storage unit 20. The satisfaction estimation model learning method of the embodiment is realized when the satisfaction estimation model learning apparatus 1 performs processes of respective steps illustrated in FIG. 5.

The satisfaction estimation model learning apparatus 1 is a special apparatus configured such that a special program is load onto a known or dedicated computer including, for example, a central processing unit (CPU), a main storage device (RAM: random access memory), and the like. For example, the satisfaction estimation model learning apparatus 1 executes each process under the control of the CPU. For example, data input to the satisfaction estimation model learning apparatus 1 or data obtained by each process is stored in a main storage device, and the data stored in the main storage device is read out to the CPU if necessary and used for other processes. Some of respective processing units of the satisfaction estimation model learning apparatus 1 may be configured by hardware such as an integrated circuit. Each storage unit installed in the satisfaction estimation model learning apparatus 1 can be constituted by, for example, a main storage device such as a random access memory (RAM), an auxiliary storage device constituted by a hard disk, an optical disk, or a semiconductor memory device such as a flash memory, or middleware such as a relational database or a key value store. Each storage unit installed in the satisfaction estimation model learning apparatus 1 may be logically divided and may be stored in one physical storage device.

The learning data storage unit 10 stores the learning data used for learning the satisfaction estimation model. The learning data includes a conversation voice containing a conversation including at least one speech of the target speaker and at least one speech of the counterpart speaker, a label indicating a correct answer value of the conversation satisfaction for the conversation (hereinafter referred to as a "conversation satisfaction label"), and a label indicating a correct answer value of the speech satisfaction for each speech included in the conversation (hereinafter referred to as a "speech satisfaction label"). The target speaker represents a speaker who is a target of satisfaction estimation, and refers to, for example, a customer in a call at a call center. The counterpart speaker represents a speaker other than the target speaker among the speakers participating in the conversation, and refers to, for example, an operator in the call at the call center. The conversation satisfaction label and the speech satisfaction label can be assigned manually. The call satisfaction and the speech satisfaction are assumed to indicate, for example, one of three steps: satisfied/normal/dissatisfaction.

Figure 5:
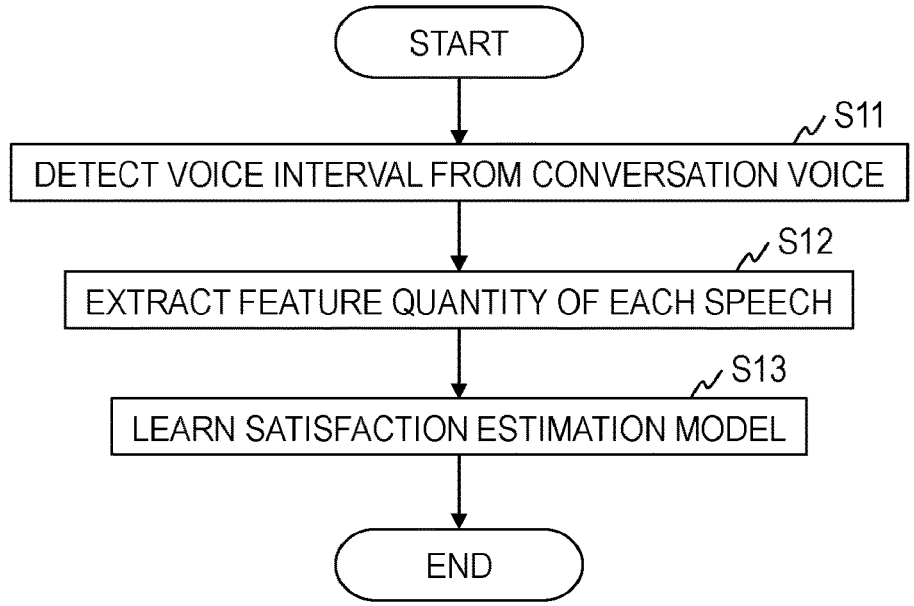
FIG. 5 is a diagram illustrating a processing procedure of a satisfaction estimation model learning method.

Hereinafter, a satisfaction estimation model learning method executed by the satisfaction estimation model learning apparatus 1 of the embodiment will be described with reference to FIG. 5.

In step S11, the voice interval detecting unit 11 detects a voice interval from the conversation voice stored in the learning data storage unit 10, and acquires a speech of one or more target speakers. For example, a technique based on power thresholding can be used as a method of detecting the voice interval. Also, other voice interval detection techniques such as a technique based on a likelihood ratio of a voice/non-voice model may be used. The voice interval detecting unit 11 outputs the speech of the acquired target speaker to the feature quantity extracting unit 12.

In step S12, the feature quantity extracting unit 12 receives the speech of the target speaker from the voice interval detecting unit 11, and extracts the feature quantity for each speech. The feature quantity extracting unit 12 outputs the extracted feature quantity of each speech to the model learning unit 13. As the feature quantity to be extracted, at least one or more of a prosodic feature, a conversational feature, and a linguistic feature are used.

As the prosodic feature, at least one or more of a mean, a standard deviation, a maximum value, and a minimum value of a fundamental frequency and power in speech, a speech speed in speech, and a duration of a final phoneme in speech are used. Here, the fundamental frequency and the power are obtained for each of frames into which the speech is divided. In a case in which the speech speed and the duration of the final phoneme are used, a phoneme sequence in the speech is assumed to be estimated using speech recognition.

As the conversational feature, at least one or more of a time from an immediately previous speech of the target speaker, a time from the speech of the counterpart speaker to the speech of the target speaker, a time from the speech of the target speaker to the speech of a next counterpart speaker, the length of the speech of the target speaker, lengths of previous and next speeches of the counterpart speaker, the number of backchannels of the target speaker included in previous and next speeches of the counterpart speaker, and the number of backchannels of the counterpart speaker included in the speech of the target speaker are used.

As the linguistic feature, at least one or more of the number of words in the speech, the number of fillers in the speech, and the number of appearances of appreciative words in the speech are used. In a case in which the linguistic feature is used, the words appearing in the speech is estimated using speech recognition, and a result thereof is used. The appreciative words are assumed to be registered in advance, and for example, the number of occurrences of "thanks" or "no thanks" is assumed to be obtained.

In step S13, the model learning unit 13 receives the feature quantity of each speech from the feature quantity extracting unit 12, reads the conversation satisfaction label corresponding to the conversation voice and the speech satisfaction label corresponding to each speech stored in the learning data storage unit 10, and learns the satisfaction estimation model simultaneously estimating and outputting the speech satisfaction and the conversation satisfaction using the feature quantity of each speech as an input. The model learning unit 13 stores the learned satisfaction estimation model in the satisfaction estimation model storage unit 20.

A structure of the satisfaction estimation model has been described above with reference to FIG. 1, and the recurrent neural network (RNN) is used as the speech satisfaction estimator and the conversation satisfaction estimator. Here, for example, a long short-term memory recurrent neural network (LSTM-RNN) is used as the recurrent neural network. Since the recurrent neural network is a model of performing estimation on the basis of chronological information, the speech satisfaction and the conversation satisfaction can be estimated on the basis of a temporal change in input information, and the high estimation accuracy can be expected.

As illustrated in FIG. 1, both the estimation value of the speech satisfaction of each speech and an output value of the speech satisfaction estimation model part (an output of LSTM-RNN) are used as the input of the conversation satisfaction estimation model part. Since the output value of the speech satisfaction estimation model part does not include the speech satisfaction but includes the information contributing to the estimation of the conversation satisfaction accompanied by the speech satisfaction, it is used as the input of the conversation satisfaction estimation model part.

For the learning of the satisfaction estimation model, for example, a back propagation through time (BPTT) which is a learning technique of the existing LSTM-RNN is used. Here, RNN other than the LSTM-RNN may be used, and for example, a gated recurrent unit (GRU) or the like may be used. Further, the LSTM-RNN is configured using an input gate and an output gate or using an input gate, an output gate, and an oblivion gate, and the GRU is configured using a reset gate and an update gate. As the LSTM-RNN, a bidirectional LSTM-RNN may be used, or a unidirectional LSTM-RNN may be used. In a case in which the bidirectional LSTM-RNN is used, since information of a future speech can be used in addition to information of a past speech, the estimation accuracies of the speech satisfaction and the conversation satisfaction are improved, and it is necessary to input all speeches included in the conversation at once. In a case in which the unidirectional LSTM-RNN is used, only the information of the past speech can be used, but there is an advantage that the speech satisfaction can be estimated even during the conversation. The former is applicable to the speech analysis or the like, and the latter is applicable to real-time monitoring of the customer satisfaction.

When the satisfaction estimation model is learned, as illustrated in FIG. 3, the estimation error of the conversation satisfaction and the estimation error of the speech satisfaction are propagated. At this time, more robust model learning becomes possible by adjusting which of the estimation error of the conversation satisfaction and the estimation error of the speech satisfaction is more emphasized. Here, this is realized by expressing the loss function of the entire satisfaction estimation model by the loss function of the conversation satisfaction estimation model part and weighting of the loss function of the speech satisfaction estimation model part. Specifically, a loss function L of the satisfaction estimation model is indicated by the following Formula.

$$L = \lambda L_t + (1-\lambda) L_c$$

Here, $\lambda$ indicates a predetermined weight for the loss function of the model, $L_t$ indicates the loss function of the speech satisfaction estimation model part, and $L_c$ indicates the loss function of the conversation satisfaction estimation model part. $\lambda$ can be adjusted arbitrarily.

[Satisfaction Estimating Apparatus]

Figure 6:
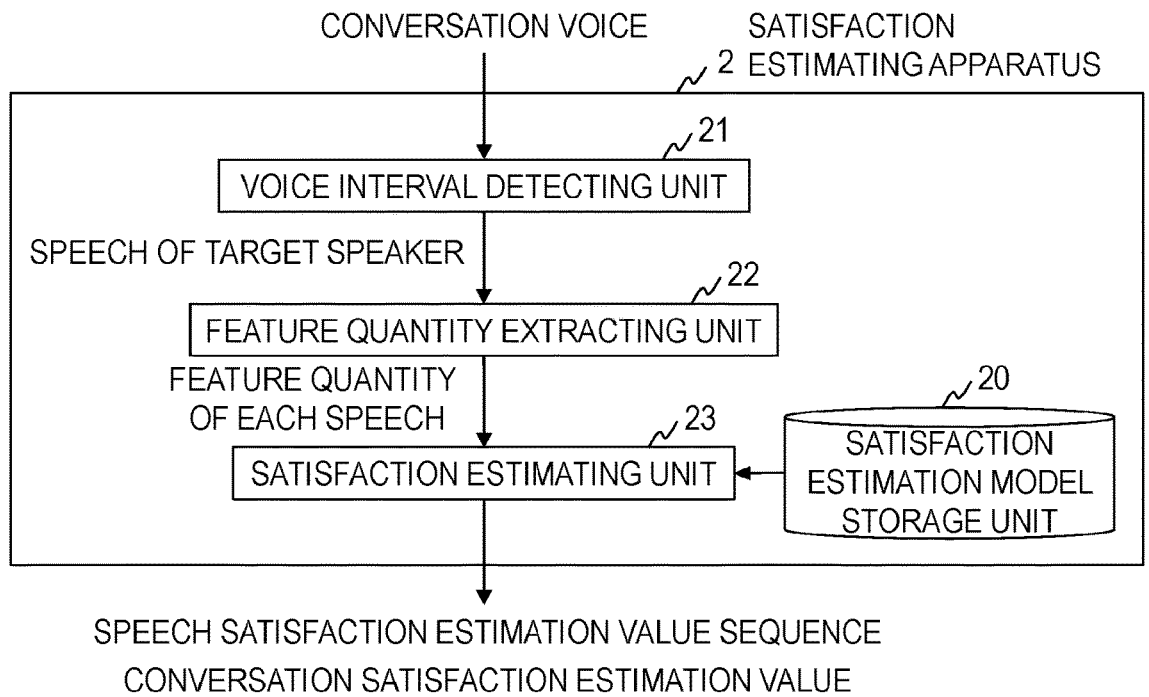
FIG. 6 is a diagram illustrating a functional configuration of a satisfaction estimating apparatus.

As illustrated in FIG. 6, a satisfaction estimating apparatus 2 includes a satisfaction estimation model storage unit 20, a voice interval detecting unit 21, a feature quantity extracting unit 22, and a satisfaction estimating unit 23. The satisfaction estimating apparatus 2 receives a conversation voice containing a voice of a conversation serving as a satisfaction estimation target, estimates the speech satisfaction of each speech in the conversation and the conversation satisfaction of the conversation using the satisfaction estimation model stored in the satisfaction estimation model storage unit 20, and outputs the sequence by the estimation value of the speech satisfaction and the estimation value of the conversation satisfaction. The satisfaction estimation method of the embodiment is realized when the satisfaction estimating apparatus 2 performs processes of respective steps illustrated in FIG. 7.

The satisfaction estimating apparatus 2 is a special apparatus configured such that a special program is load onto a known or dedicated computer including, for example, a central processing unit (CPU), a main storage device (RAM: random access memory), and the like. For example, the satisfaction estimating apparatus 2 executes each process under the control of the CPU. For example, data input to the satisfaction estimating apparatus 2 or data obtained by each process is stored in a main storage device, and the data stored in the main storage device is read out to the CPU if necessary and used for other processes. Some of respective processing units of the satisfaction estimating apparatus 2 may be configured by hardware such as an integrated circuit. Each storage unit installed in the satisfaction estimating apparatus 2 can be constituted by, for example, a main storage device such as a random access memory (RAM), an auxiliary storage device constituted by a hard disk, an optical disk, or a semiconductor memory device such as a flash memory, or middleware such as a relational database or a key value store.

The satisfaction estimation model storage unit 20 stores the learned satisfaction estimation model generated by the satisfaction estimation model learning apparatus 1.

Figure 7:
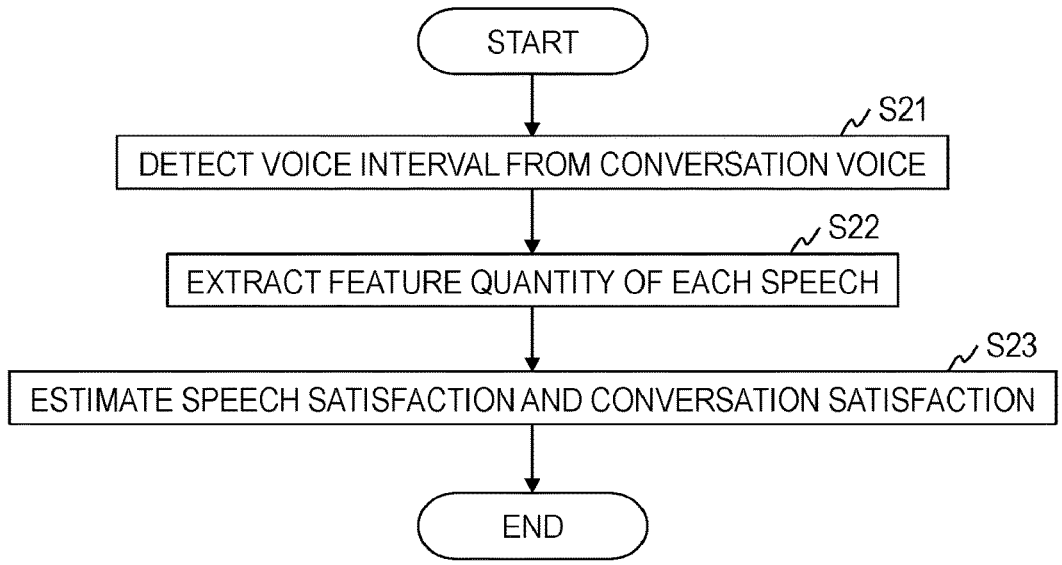
FIG. 7 is a diagram illustrating a processing procedure of a satisfaction estimation method.

Hereinafter, the satisfaction estimation method executed by the satisfaction estimating apparatus 2 of the embodiment will be described with reference to FIG. 7.

In step S21, the voice interval detecting unit 21 detects the voice interval from the conversation voice input to satisfaction estimating apparatus 2 and acquires one or more speeches of the target speaker. The conversation voice includes at least one speech of the target speaker and at least one speech of the counterpart speaker, similarly to the conversation voice of the learning data. As a method of detecting the voice interval, a method similar to that of the voice interval detecting unit 11 of the satisfaction estimation model learning apparatus 1 may be used. The voice interval detecting unit 21 outputs the acquired speeches of the target speaker to the feature quantity extracting unit 22.

In step S22, the feature quantity extracting unit 22 receives the speeches of the target speaker from the voice interval detecting unit 21 and extracts the feature quantity for each speech. The feature quantity to be extracted may be similar to that of the feature quantity extracting unit 12 of the satisfaction estimation model learning apparatus 1. The feature quantity extracting unit 22 outputs the extracted feature quantity of each speech to the satisfaction estimating unit 23.

In step S23, the satisfaction estimating unit 23 receives the feature quantity of each speech from the feature quantity extracting unit 22, inputs the feature quantity to the satisfaction estimation model stored in the satisfaction estimation model storage unit 20, and simultaneously estimates the conversation satisfaction of the conversation voice and the speech satisfaction of each speech included in the conversation voice. The satisfaction estimation model can simultaneously obtain the sequence by the estimation value of the speech satisfaction of each speech and the estimation value of the conversation satisfaction by receiving the feature quantity of each speech of the target speaker and performing forward propagation. The satisfaction estimating unit 23 outputs the sequence by the estimation values of the speech satisfaction of each speech and the estimation value of the conversation satisfaction from the satisfaction estimating apparatus 2.

[Modification]

In the above embodiment, the example in which the satisfaction estimation model learning apparatus 1 and the satisfaction estimating apparatus 2 are configured as separate apparatuses has been described, but it is also possible to configure one satisfaction estimating apparatus having both a function of learning the satisfaction estimation model and a function of estimating the satisfaction using the learned satisfaction estimation model. That is, the satisfaction estimating apparatus of the modification includes the learning data storage unit 10, the voice interval detecting unit 11, the feature quantity extracting unit 12, the model learning unit 13, the satisfaction estimation model storage unit 20, and the satisfaction estimating unit 23.

As described above, the satisfaction estimation model learning apparatus and the satisfaction estimating apparatus of the present invention are configured to constitute a single model by hierarchically connecting a model for estimating the conversation satisfaction and a model for estimating the speech satisfaction so that the conversation satisfaction and the speech satisfaction are learned simultaneously and integrally. Accordingly, since the relation between the conversation satisfaction and the speech satisfaction can be used, the estimation accuracies of the conversation satisfaction and the speech satisfaction can be improved.

Although the embodiment of the present invention has been described above, a specific configuration is not limited to the above embodiment, and an appropriate design change or the like not departing from the gist of the present invention is also included in the present invention. The various processes described in the embodiment are not only executed in a chronological order in accordance with the order of description but also may be executed in parallel or individually depending on a process capability of the apparatus executing the process or if necessary.

[Program and Recording Medium]

In a case in which various types of processing functions in each apparatus described in the embodiment are realized by a computer, processing content of the functions of each apparatus is described by a program. Further, various types of processing functions in each apparatus are realized on the computer as the program is executed by the computer.

The program describing the processing content can be recorded in a computer readable recording medium. Examples of the computer readable recording medium include a magnetic recording device, an optical disk, an optical magnetic recording medium, and a semiconductor memory.

The program is distributed, for example, by selling, transferring, lending, or the like a portable recording medium such as a DVD or CD-ROM having the program recorded therein. Further, the program may be stored in a storage device of a server computer, and the program may be distributed by transferring the program from the server computer to another computer via a network.

For example, the computer that executes such a program first stores the program recorded in the portable recording medium or the program transferred from the server computer in its own storage device. Then, when the process is executed, the computer reads the program stored in its own storage device and executes the process according to the read program. Also, as another execution form of the program, the computer may read the program directly from the portable recording medium and execute the process according to the program, and further the computer may execute the process according to the received program sequentially each time the program is transferred from the server computer to the computer. Further, instead of transferring the program from the server computer to the computer, the above-described process may be executed by a so-called application service provider (ASP) service of realizing the processing function in accordance with an execution instruction thereof and result acquisition. The program in the present form is assumed to include information which is provided for processing by a computer and equivalent to a program (for example, data which is not a direct command to a computer but has a property defining a process of the computer).

Also, in the present embodiment, the present apparatus is configured by executing a predetermined program on a computer, but at least some of the processing content may be realized as hardware.

What is claimed is:

1. A satisfaction estimation model learning apparatus, comprising:
   processing circuitry configured to:
   store learning data including a conversation voice containing a conversation including a plurality of speeches, a correct answer value of a conversation satisfaction for the conversation, and a correct answer value of a speech satisfaction for each of the speeches included in the conversation; and
   learn a satisfaction estimation model using a feature quantity of each speech extracted from the conversation voice, the correct answer value of the speech satisfaction, and the correct answer value of the conversation satisfaction, the satisfaction estimation model having a speech satisfaction estimation model part that receives a feature quantity of each speech and estimates the speech satisfaction of each speech, and a conversation satisfaction estimation model part that receives at least the speech satisfaction of each speech and estimates the conversation satisfaction,
   wherein the speech satisfaction estimation model part is hierarchically connected with the conversation satisfaction estimation model part so that an iterative process is performed, for each of the plurality of speeches, in which the speech satisfaction estimation model part first estimates the speech satisfaction from the feature quantity of a respective one of the plurality of speeches and then the conversation satisfaction estimation model part estimates the conversation satisfaction from the speech satisfaction of the respective one of the plurality of speeches before the iterative process is performed again for a next one of the plurality of speeches,
   wherein the feature quantity of each speech is at least one or more of a prosodic feature, a conversational feature, and a linguistic feature,
   wherein the prosodic feature is at least one or more of a mean, a standard deviation, a maximum value, and a minimum value of a fundamental frequency and power in speech, a speech speed in speech, and a duration of a final phoneme in speech,
   the conversational feature is at least one or more of a time from an immediately previous speech of a target speaker, a time from the speech of a counterpart speaker to the speech of the target speaker, a time from the speech of the target speaker to the speech of a next counterpart speaker, a length of the speech of the target speaker, lengths of previous and next speeches of the counterpart speaker, a number of backchannels of the target speaker included in previous and next speeches of the counterpart speaker, and a number of backchannels of the counterpart speaker included in the speech of the target speaker, and the linguistic feature is at least one or more of a number of words in the speech, a number of fillers in the speech, and a number of appearances of appreciative words in the speech.

2. The satisfaction estimation model learning apparatus according to claim 1, wherein
the speech satisfaction estimation model part constitutes one speech satisfaction estimator, implemented by the processing circuitry, for one speech,
the speech satisfaction estimator receives the feature quantity of each speech and estimates and outputs the speech satisfaction of the speech using information related to a speech before the speech or speeches before and after the speech,
the conversation satisfaction estimation model part constitutes one conversation satisfaction estimator, implemented by the processing circuitry, for one speech satisfaction estimator, implemented by the processing circuitry, and
the conversation satisfaction estimator receives the speech satisfaction outputted from the speech satisfaction estimator and information contributing to the estimation of the conversation satisfaction accompanied by the speech satisfaction, and estimates and outputs the conversation satisfaction from a first speech included in the conversation to the speech using the information related to the speech before the speech.

3. The satisfaction estimation model learning apparatus according to claim 2, wherein
the speech satisfaction estimator and the conversation satisfaction estimator include any one of an input gate and an output gate, an input gate and an output gate and an oblivion gate, and a reset gate and an update gate.

4. The satisfaction estimation model learning apparatus according to any one of claims 1 to 3, wherein
a loss function of the satisfaction estimation model is a weighted sum of a loss function of the speech satisfaction estimation model part and a loss function of the conversation satisfaction estimation model part, and is able to adjust weights of the loss function of the speech satisfaction estimation model part and the loss function of the conversation satisfaction estimation model part.

5. A system, comprising:
the satisfaction estimation model learning apparatus according to any one of claims 1 to 3; and
a satisfaction estimating apparatus,
wherein processing circuitry of the satisfaction estimating apparatus is configured to:
store the satisfaction estimation model learned by the satisfaction estimation model learning apparatus; and
input the feature quantity of each speech extracted from the conversation voice containing the conversation including a plurality of speeches to the satisfaction estimation model and estimates the speech satisfaction for each speech and the conversation satisfaction for the conversation.

6. A satisfaction estimation model learning method,
wherein learning data including a conversation voice containing a conversation including a plurality of speeches, a correct answer value of a conversation satisfaction for the conversation, and a correct answer value of a speech satisfaction for each of the speeches included in the conversation is stored in processing circuitry, the satisfaction estimation model learning method comprising:

learning, by the processing circuitry, a satisfaction estimation model using a feature quantity of each speech extracted from the conversation voice, the correct answer value of the speech satisfaction, and the correct answer value of the conversation satisfaction, the satisfaction estimation model configured by connecting a speech satisfaction estimation model part that receives a feature quantity of each speech and estimates the speech satisfaction of each speech with a conversation satisfaction estimation model part that receives at least the speech satisfaction of each speech and estimates the conversation satisfaction,
wherein the speech satisfaction estimation model part is hierarchically connected with the conversation satisfaction estimation model part so that an iterative process is performed, for each of the plurality of speeches, in which the speech satisfaction estimation model part first estimates the speech satisfaction from the feature quantity of a respective one of the plurality of speeches and then the conversation satisfaction estimation model part estimates the conversation satisfaction from the speech satisfaction of the respective one of the plurality of speeches before the iterative process is performed again for a next one of the plurality of speeches,
wherein the feature quantity of each speech is at least one or more of a prosodic feature, a conversational feature, and a linguistic feature,
wherein the prosodic feature is at least one or more of a mean, a standard deviation, a maximum value, and a minimum value of a fundamental frequency and power in speech, a speech speed in speech, and a duration of a final phoneme in speech,
the conversational feature is at least one or more of a time from an immediately previous speech of a target speaker, a time from the speech of a counterpart speaker to the speech of the target speaker, a time from the speech of the target speaker to the speech of a next counterpart speaker, a length of the speech of the target speaker, lengths of previous and next speeches of the counterpart speaker, a number of backchannels of the target speaker included in previous and next speeches of the counterpart speaker, and a number of backchannels of the counterpart speaker included in the speech of the target speaker, and
the linguistic feature is at least one or more of a number of words in the speech, a number of fillers in the speech, and a number of appearances of appreciative words in the speech.

7. A method comprising:
the satisfaction estimation model learning method according to claim 6; and
a satisfaction estimation method that includes
storing the satisfaction estimation model learned by the satisfaction estimation model learning method in a model storage memory, and
inputting, by processing circuitry, the feature quantity of each speech extracted from the conversation voice containing the conversation including a plurality of speeches to the satisfaction estimation model and estimating the speech satisfaction for each speech and the conversation satisfaction for the conversation.

8. A non-transitory computer-readable recording medium on which a satisfaction estimation model learning program is recorded when executed by a computer, the program causing the computer to operate as the satisfaction estimation model learning apparatus according to claim 1.

\* \* \* \* \*